(12) United States Patent
Morita

(10) Patent No.: US 7,093,896 B2
(45) Date of Patent: Aug. 22, 2006

(54) VEHICLE SEAT

(75) Inventor: Rikiya Morita, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 136 days.

(21) Appl. No.: 10/694,917

(22) Filed: Oct. 28, 2003

(65) Prior Publication Data

US 2004/0084940 A1    May 6, 2004

(51) Int. Cl.
B60N 2/28    (2006.01)

(52) U.S. Cl. ..................................... 297/253

(58) Field of Classification Search .......... 297/250.1, 297/253, 256.16; 248/503.1
See application file for complete search history.

(56) References Cited

U.S. PATENT DOCUMENTS

| 6,183,044 B1 * | 2/2001 | Koyanagi et al. ...... 297/256.16 |
| 6,234,572 B1 | 5/2001 | Shiino et al. |
| 6,322,141 B1 | 11/2001 | Dutkievic et al. |
| 6,354,648 B1 * | 3/2002 | Allan et al. ............... 296/65.03 |
| 6,375,260 B1 * | 4/2002 | Hiramatsu et al. ..... 297/265.16 |
| 6,478,376 B1 * | 11/2002 | Hayashi et al. .......... 297/250.1 |
| 6,513,873 B1 * | 2/2003 | Tsuda et al. ................ 297/253 |
| 6,669,288 B1 * | 12/2003 | Nakagawa et al. .... 297/256.16 |
| 6,764,135 B1 * | 7/2004 | Sasaki et al. .......... 297/256.16 |

FOREIGN PATENT DOCUMENTS

| DE | 200 15 161 U1 | 2/2001 |
| DE | 100 44 621 C1 | 2/2002 |
| EP | 1 197 378 A1 | 4/2002 |
| JP | 2001-122004 A1 | 5/2001 |
| WO | WO-01/36226 A2 | 5/2005 |

OTHER PUBLICATIONS

Patent Abstracts of Japan, vol. 2000, No. 22, Mar. 9, 2001, JP 2001 122004 A1, Nissan Shatai Co. Ltd.

* cited by examiner

Primary Examiner—Peter R. Brown
(74) Attorney, Agent, or Firm—Darby & Darby

(57) ABSTRACT

A raised portion of a seat cushion is formed by attaching a sub-cushion portion including a pair of notches formed so as to allow a pair of connectors to pass therethrough to a seat cushion pad. In the state where the sub-cushion portion is attached to the seat cushion pad, a pair of through holes, through which the pair of connectors provided for a child safety seat inserted from the front face of the vehicle seat can pass to project from the back face of the vehicle seat, are formed. At the same time, fixation anchors, to which the connectors projecting from the through holes are connected, are provided on axes of the through holes. Thus, a vehicle seat is provided, in which the workability at the installation of the child safety seat can be improved even for the vehicle seat including the seat cushion with a raised rear end.

6 Claims, 3 Drawing Sheets

VEHICLE SEAT

BACKGROUND OF THE INVENTION

The present invention relates to a vehicle seat, and more specifically, to a vehicle seat on which a child safety seat can be installed.

The present application claims priority from Japanese Patent Application No. 2002-319331, the disclosure of which is incorporated herein by reference.

Generally, an ISOFIX child safety seat involves the connection of a connector of a child safety seat to a fixation anchor attached to a vehicle body. As shown in FIG. 4A, since such a child safety seat simplifies its installation onto a vehicle seat and prevents erroneous attachment, the number of types of vehicle in compliance with the ISOFIX system tends to increase.

Another system, which is partially different from the above-described ISOFIX system, has also been proposed. According to such a system, instead of providing a fixation anchor at the side of the vehicle body, the fixation anchor is embedded in a rear end of a seat cushion as shown in FIG. 4B (for example, see pages 3 to 4 and FIGS. 1 to 3 of Japanese Patent Application Laid-Open No. 2001-122004).

In the former conventional system, as shown in FIG. 4A, in order to install a child safety seat 1 onto a vehicle seat 2, it is necessary to first insert a pair of connectors 6 (only one of them is shown) extending backwardly from a base seat 5 into a gap between a seat cushion 3 of the vehicle seat 2 and a seat back 4 while connecting the connectors 6 to fixation anchors 7 attached to a vehicle body so as to fix the base seat 5. However, since the fixation anchors 7 are provided in the rear of the seat back 4, the fixation anchors 7 are hard to see. Therefore, the alignment between the connectors 6 and the fixation anchor 7 needs the proficiency of a driver or a fellow passenger.

Therefore, without the proficiency in alignment, it is necessary to put a hand into the gap between the seat cushion 3 and the seat back 4 so as to confirm the positions of the fixation anchors 7 for installation of the child safety seat 1. Therefore, there is a possibility that the child safety seat 1 may not be installed as quickly as desired.

In addition, if a rear end of the seat cushion 3 of the vehicle seat 2 is formed so as to be upwardly raised, there will be a problem in that the connectors 6 may be caught by the rear end when the connectors 6 are to be inserted into the gap.

Moreover, the rear end of the seat cushion 3, which is upwardly raised, is integrally formed with a seat cushion pad 3A. Furthermore, a cushion wire 8 for keeping the shape of the seat cushion 3 is provided in the rear end of the seat cushion 3. Thus, it is difficult to form a concave portion and a guide hole in such a manner that the connectors 6 are not caught by the cushion wire 8 at the insertion of the connectors 6 in view of prevention of degradation in esthetic quality and the structure of a shape of the seat cushion pad 3A.

In order to solve the above-mentioned problems, the following method has been proposed. According to the method, a pair of hollow guide cups 9 as shown in FIG. 4C are inserted between the seat cushion 3 and the seat back 4 so as to be connected to the fixation anchors 7 in advance, thereby allowing an easy check of the positions of the fixation anchors 7. With such a method, although the workability at the installation of the child safety seat 1 can be improved, the appearance is not preferred when the child safety seat 1 is not installed. Moreover, each time an adult sits on the vehicle seat 2, the guide cups 9 should be detached.

According to the latter conventional method described in the above-mentioned patent document, since the fixation anchors 7 are provided in the gap between the seat cushion 3 and the seat back 4 as shown in FIG. 4B, the connectors 6 of the child safety seat 1 can be somewhat easily connected with the fixation anchors 7. However, a lower end of each of the fixation anchors 7 is connected to the rear end of a seat cushion frame 10 forming a framework structure of the seat cushion 3. Accordingly, the child safety seat 1 is directly connected and fixed to the seat cushion frame 10 via the fixation anchors 7.

Thus, a forward load, which is applied onto the child safety seat 1 when the child safety seat 1 is subjected to an impact, is entirely applied to the seat cushion frame 10. Therefore, not only a connected portion between the fixation anchor 7 and the seat cushion frame 10 but also the seat cushion frame 10 itself must be significantly reinforced in rigidity.

SUMMARY OF THE INVENTION

The present invention is devised to solve the above-described problems of a conventional vehicle seat, and has an object of providing a vehicle seat capable of improving the workability at the installation of a child safety seat even onto the vehicle seat with a seat cushion having an upwardly raised rear end, which can offer preferred appearance even when the child safety seat is not installed, without remarkably changing a framework structure inside the seat cushion.

In order to achieve the above-described object, a vehicle seat according to a first aspect of the present invention includes a seat cushion including an upwardly raised portion at its rear end. Through the seat cushion, a connector backwardly extending from a seat base is allowed to pass to be connected to a fixation anchor so as to fix a child safety seat. On the seat base, the child safety seat is installed and fixed. The fixation anchor is provided at the side of a vehicle body in the rear of the vehicle seat. In this configuration, the seat cushion is completely formed by attaching a sub-cushion portion to a seat cushion pad, and a through hole is formed in a state where the sub-cushion portion is attached to the seat cushion pad. Through the through hole, the connector inserted from a front face of the vehicle seat is allowed to project from its back face. The through hole is formed such that the fixation anchor to which the connector projecting from the through hole is connected is positioned on an axis of the through hole.

At the rear end of the vehicle seat according to this aspect of the present invention, the raised portion is formed by attaching the sub-cushion portion, through which the connector can pass, to the seat cushion pad. The through hole is formed in the raised portion so that the connector is inserted from the front face of the seat to project from the back face of the seat and its projecting tip is connected to the fixation anchor.

In the prior art, it was considered difficult to provide a through hole in the seat cushion pad itself in view of the structure of the shape. According to the first aspect of the present invention described above, however, instead of providing the through hole in the seat cushion pad itself, the through hole is formed by attaching the sub-cushion portion to the seat cushion pad. Therefore, the through hole can be easily provided at the rear end of the vehicle seat. In addition, at the installation of the child safety seat onto the vehicle seat, mere insertion of the connector of the base seat into the through hole allows easy connection and fixation to the fixation anchor in the rear of the seat back, which is positioned on the axis of the through hole.

Therefore, even if the fixation anchor is hardly visible, it is not necessary to feel for the fixation anchor in a gap between the seat cushion and the seat back. As a result, a procedure and the amount of time required to install the child safety seat can be remarkably reduced and the labor is remarkably saved to improve the installability of the child safety seat. In addition, the installation is simple and therefore does not need any proficiency.

Furthermore, since the fixation anchor, to which the connector provided for the child safety seat is connected, is not embedded in the seat cushion pad but is provided at the side of the vehicle body, the needs of remarkably changing the framework structure in the seat cushion are reduced.

In a vehicle seat according to a second aspect of the present invention, in addition to the structure of the first aspect, the sub-cushion portion has an insertion hole, to which a cushion wire projecting from the seat cushion pad is inserted to then be fixed.

In the vehicle seat according to the second aspect of the present invention, the cushion wire upwardly projecting from the seat cushion pad is pushed into the insertion hole formed in the sub-cushion portion so that the seat cushion pad and the sub-cushion portion are aligned with each other and are fixed at the same time.

Therefore, according to the vehicle seat of the second aspect, the cushion wire is inserted into the insertion hole of the sub-cushion portion to easily position the sub-cushion portion. Accordingly, the amount of time required to align the sub-cushion portion and the seat cushion pad with each other is reduced to improve the efficiency of the seat installation procedure. In addition, since the projecting cushion wire is enveloped in the sub-cushion portion, the shape of the sub-cushion portion can be prevented from being lost.

Furthermore, since the sub-cushion portion is integrated with the seat cushion pad through the cushion wire, the subsequent steps, in particular, a seat surface cover attachment step can be prevented from being complicated.

In a vehicle seat according to a third aspect of the present invention, in addition to the structures of the first and the second aspects, the through hole has a gate for moving to open the through hole when the connector is inserted into the through hole and for moving to close the through hole when the connector is pulled out of the through hole.

With such a structure, when the connector is pulled out of the through hole, the through hole is closed by the gate. Accordingly, even when the child safety seat is not installed, the through hole is not noticeable. Therefore, the esthetic value can be maintained even when the child safety seat is not installed. Moreover, since the gate serves as an indication to guide the connector to the through hole, the workability at the installation of the child safety seat can be improved. Simultaneously, the friction with the seat surface cover at the insertion of the connector can be reduced.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
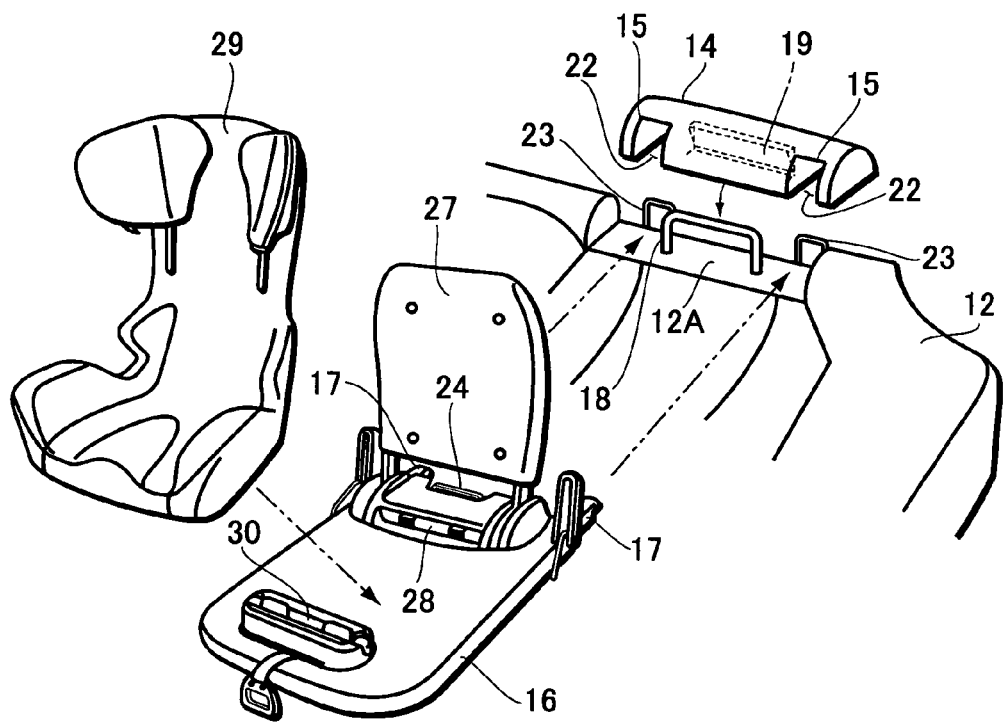
FIG. 1 is a perspective view for illustrating a vehicle seat to which the present invention is applied.

Hereinafter, an embodiment of the present invention, which is considered to be the most preferred, will be described with reference to FIGS. 1 to 2. FIG. 1 is a perspective view for illustrating a vehicle seat to which the present invention is applied, and FIG. 2 is an enlarged view of a principal part of the vehicle seat shown in FIG. 1.

Figure 2:
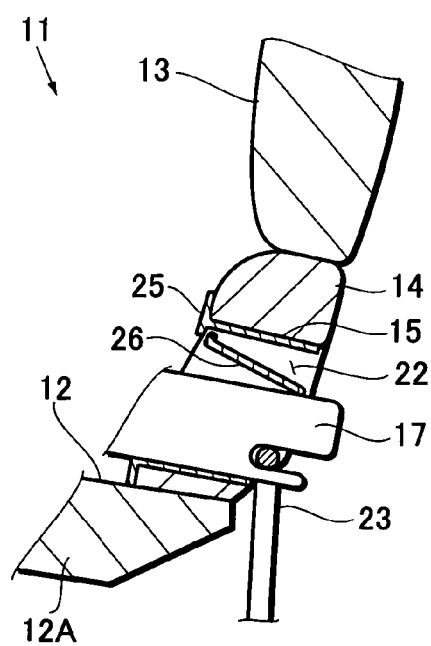
FIG. 2 is an enlarged view of a principal part of the vehicle seat shown in FIG. 1.

As shown in FIGS. 1 and 2, a vehicle seat 11 serving as a front passenger seat or a rear seat, includes: a seat cushion 12 for supporting the hips of a passenger; and a seat back 13 for supporting the back of a passenger, which is provided on the side of a rear end of the seat cushion 12. A sub-cushion portion 14 in an upwardly raised shape is provided at the rear end of the seat cushion 12, which forms a boundary line with the seat back 13.

The sub-cushion portion 14 is independently formed of a seat cushion pad 12A which is formed of a pad material used for the seat cushion 12. The bottom face of the sub-cushion portion 14 can be integrally attached to a rear end of an upper face of the cushion seat pad 12A. In the bottom face of the sub-cushion portion 14, a pair of downwardly opening notches 15, each having a hat-like sectional shape, are formed at a predetermined distance so as to be parallel in a horizontal direction, that is, a seat width direction. The pair of notches 15 are formed so that a front side of the sub-cushion portion 14 is in communication with its back side. At the same time, each of the notches 15 is formed to be slightly larger than a sectional shape of each of a pair of connectors 17 so that the pair of connectors 17 backwardly extending from a base seat 16 can be respectively inserted into the notches 15.

The sub-cushion portion 14 and the seat cushion pad 12A can be connected and fixed through a cushion wire 18 which is formed so as to upwardly project from the seat cushion pad 12A. More specifically, on the bottom face of the sub-cushion portion 14, an insertion hole 19, which is formed so as to be concave from the bottom face toward the interior, is provided at the position interposed between the pair of notches 15. A projecting upper end portion of the cushion wire 18, which has a reversed U-shape when seen from the front side, is pushed into the insertion hole 19. As a result, the sub-cushion portion 14 is positioned at its attachment. At the same time, it is ensured that the sub-cushion portion 14 and the seat cushion pad 12A can be connected and fixed to each other.

Figure 3:
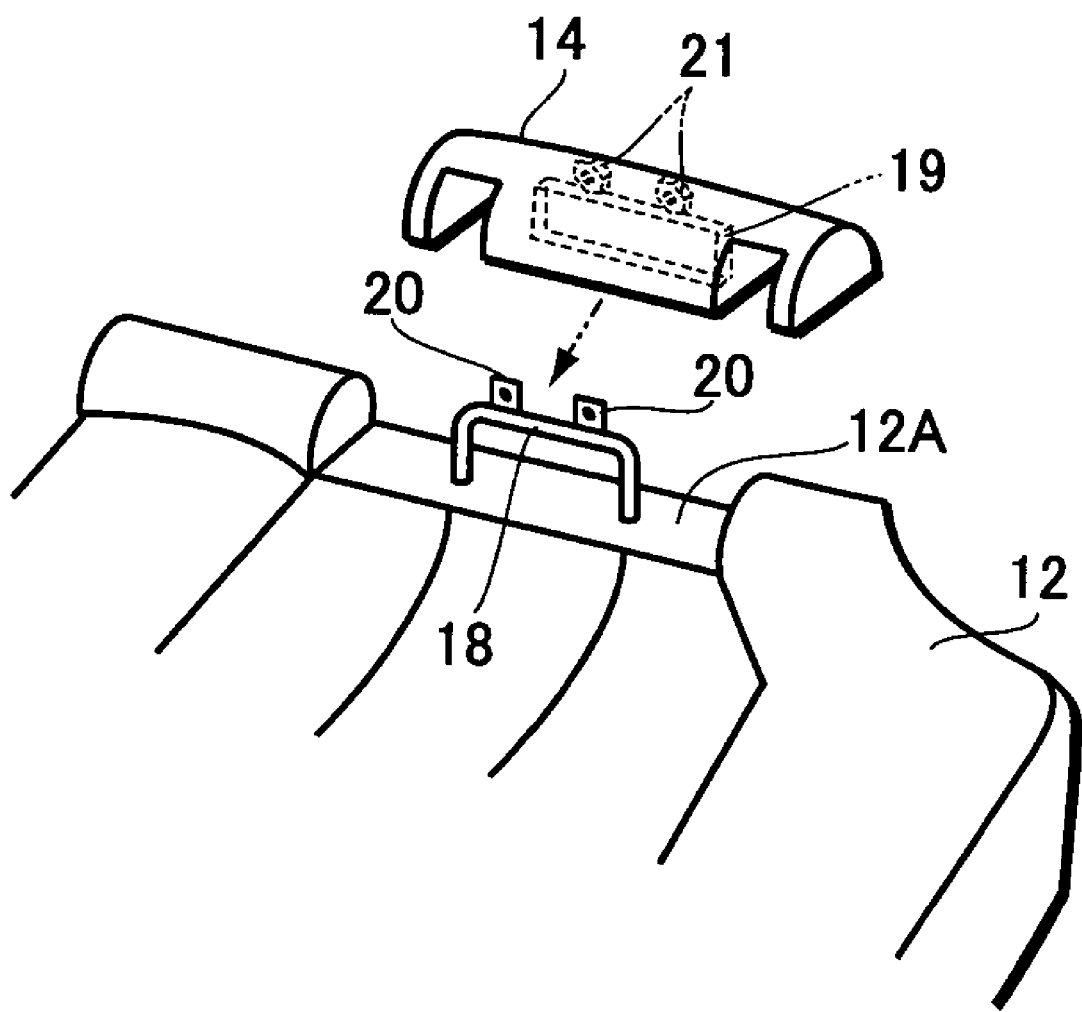
FIG. 3 is a view illustrating a structure of a sub-cushion portion different from that of the vehicle seat shown in FIG. 1.
Figure 4:
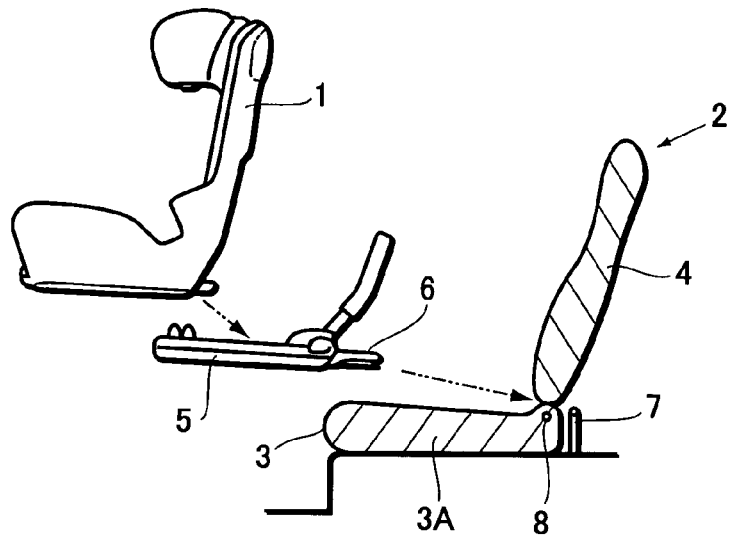
FIG. 4A is a view illustrating an installation structure of a child safety seat in compliance with an ISOFIX system.
FIG. 4B is a view illustrating an example of installation of a child safety seat different from that shown in FIG. 4A.
FIG. 4C is an outside view for illustrating guide cups.
Figure 4:
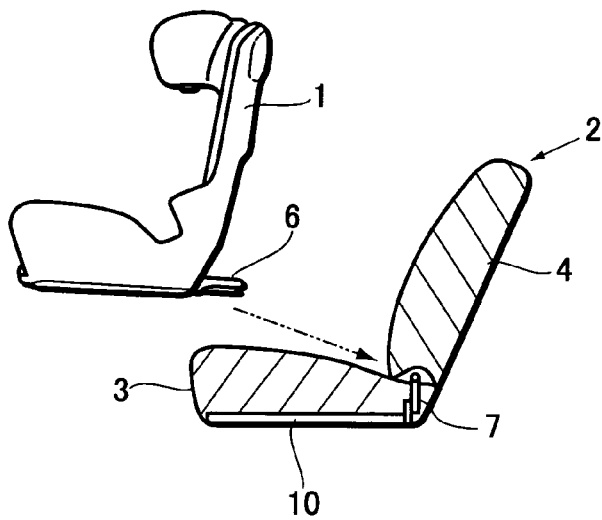
Figure 4:
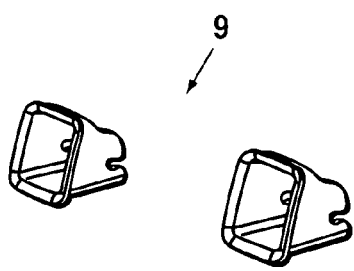

The connection between the sub-cushion portion 14 and the seat cushion pad 12A is not limited to the connection realized by pushing as described above, and therefore other forms of connection can be used. For example, as shown in FIG. 3, brackets 20, which are preattached to the cushion wire 18, and nuts 21, which are provided in the sub-cushion portion 14, may be bolted together (bolts are not shown) so as to connect the sub-cushion portion 14 and the seat cushion pad 12A with each other.

For realizing such a form of connection, guide holes for guiding the bolts to the nuts 21 may be optionally provided in the sub-cushion portion 14. Since the guide holes are covered with a seat surface cover, the guide holes are hardly noticeable.

Moreover, the position where the cushion wire 18, to which the sub-cushion portion 14 is connected, is provided is not limited to the one interposed between the pair of notches 15. The cushion wire 18 may be provided at any position as long as both ends of the cushion wire 18 do not overlap the pair of notches 15; for example, the cushion wire 18 may be provided such that the pair of notches 15 are interposed between the legs of the wire 18 in a portal manner.

The cushion wire 18 is provided so as to keep the shape of the seat cushion 12. The lower ends of the cushion wire 18 are secured to a seat cushion frame (not shown) provided in the seat cushion 12.

In the state where the sub-cushion portion 14 is attached to the seat cushion pad 12A, a pair of through holes 22 penetrating the vehicle seat 11 from its front face to the back face are formed by the pair of notches 15 of the sub-cushion portion 14 and the seat cushion pad 12A at the rear end of the seat cushion 12. At the same time, the fixation anchors 23 connected to the connectors 17 are provided at the side of a vehicle body in the rear of the seat. The fixation anchors 23 are in alignment with the pair of through holes 22, respectively.

The connectors 17 of the base seat 16 are respectively inserted into the through holes 22 from their front sides. After passing through the through holes 22, the tips of the connectors 17 project from the back face of the seat to be aligned with the fixation anchors 23. Then, the tips of the connectors 17 are further pushed into the fixation anchors 23, thereby connecting and fixing the connectors 17 and the fixation anchors 23 to each other.

The through holes, which are formed in the raised portion of the vehicle seat so as to allow the connectors of the base seat for fixing the child safety seat to pass therethrough, may be directly provided in the sub-cushion portion in such a manner that the through holes penetrate the sub-cushion portion from the front face of the vehicle seat to its back face.

In the case where the vehicle seat 11 has a forward/backward sliding function, after the vehicles seat 11 is shifted to a predetermined sliding position, the connectors 17 are respectively inserted into the through holes 22. After the connection and fixation of the connectors 17 to the fixation anchors 23, the sliding function must not be adjusted.

The connection between the connectors 17 and the fixation anchors 23 is cancelled by pulling up a release lever 24 which is provided in the back of the base seat 16.

It is desirable that the sub-cushion portion 14 provided with the notches 15 and the insertion hole 19 as described above is formed of, for example, a foam molding or a blow molding. However, other moldings may also be employed as long as they can be similarly processed in detail into a shape as described above.

Once the sub-cushion portion 14 is attached to the seat cushion pad 12A, a seat surface cover (not shown) is provided to cover the seat cushion pad 12A and the sub-cushion portion 14 so as not to close the through holes 22.

Furthermore, a guide 25 made of a resin is inserted into each of the through holes 22 from the front face toward the back face. Owing to the guides 25, the smoothness of the connectors 17 at the insertion into and the removal from the through holes 22 is ensured. At the same time, the guides 25 prevent the connectors 17 from interfering with the inner walls of the through holes 22.

In front of each of the guides 25, a shutter 26 energized by a spring (not shown) is provided in such a manner that it can be opened/closed. The shutters 26 serve as indications to insert the connectors 17 into the through holes 22. At the same time, when the connectors 17 are inserted, the shutters 26 open the through holes 22 against the energizing force of the springs. On the other hand, when the connectors 17 are not inserted, the shutters 26 close the through holes 22 by the energizing force of the springs.

Then, a fitting bar 27 is strongly pushed against the seat back 13 to fix the base seat 16 to the vehicle seat 11 while the connectors 17 and the fixation anchors 23 are being connected to each other. A hook at the rear end of the child safety seat 29 is inserted into a slot 28 of the thus fixed base seat 11, whereas a forward end of the child safety seat 29 is pressed into a front lock 30 of the base seat 16 to lock the child safety seat 29. As a result, the child safety seat 29 can be steadily secured to the vehicle seat 11.

According to the structure described above, the raised portion of the vehicle seat 11 is formed by attaching the sub-cushion portion 14 including the pair of notches 15, through which the pair of connectors 17 can pass, to the seat cushion pad 12A. When the sub-cushion portion 14 is attached to the seat cushion pad 12A, the pair of through holes 22, into which the pair of connectors 17 are inserted, are formed so that the pair of connectors 17 inserted from the front face of the vehicle seat 11 can project from the back face. At the same time, the fixation anchors 23, to which the connectors 17 projecting from the through holes 22 are connected, are provided on the axes of the respective through holes 22.

With such a structure, instead of providing the through holes 22 in the seat cushion pad 12A itself, the through holes 22 are formed by attaching the sub-cushion portion 14 including the notches 15 formed therein to the seat cushion pad 12A. Therefore, the through holes 22 can be easily provided at the rear end of the seat cushion 12.

At the installation of the child safety seat 29 onto the vehicle seat 11, mere insertion of the connectors 17 of the base seat 16 into the through holes 22 allows easy connection and fixation to the fixation anchors 23 in the rear of the seat back, which are provided on the axes of the through holes 22. Therefore, even if the fixation anchors 23 are hardly visible, it is not necessary to feel for the fixation anchors 23 in the gap between the seat cushion 12 and the seat back 13. As a result, a procedure and the amount of time for installing the child safety seat 29 can be remarkably reduced to improve the installability of the child safety seat 29. In addition, the installation is simple and therefore does not need any proficiency.

Furthermore, since the fixation anchors 23, to which the connectors 17 on the side of the child safety seat 29 are connected, are provided not in the seat cushion 12 but at the side of the vehicle body in the rear of the seat back, it is not necessary to greatly change the framework structure in the seat cushion 12.

Moreover, according to the ISOFIX system, the base seat 16 to which the child safety seat 29 is fixed and the installation size of the base seat 16 are standardized. Therefore, the sub-cushion portion 14 can be commonly used among various kinds of vehicle so that the component procurement cost can be reduced.

Furthermore, according to the above-described structure, the sub-cushion portion 14 includes the insertion hole 19 at the position different from the positions where the pair of notches 15 are formed so that the cushion wire 18 projecting from the seat cushion pad 12A is inserted into the insertion hole 19 to be fixed thereto.

As a result, the cushion wire 18, which serves to connect and fix the sub-cushion portion 14 to the seat cushion pad 12A, is provided so as not to overlap the pair of notches 15 formed in the sub-cushion portion 14. Accordingly, even if a forward load is applied onto the child safety seat 29, the load is not applied to the cushion wire 18. As a result, the framework structure in the seat cushion 12 can be prevented from being subjected to an excessive load.

Moreover, the cushion wire 18 is inserted into the insertion hole 19 of the sub-cushion portion 14 to easily position the sub-cushion portion 14. Therefore, the amount of time required to align the sub-cushion portion 14 and the seat cushion pad 12A with each other can be reduced to improve the efficiency of seat installation procedure. Furthermore, since the cushion wire 18 in a projecting shape is enveloped in the sub-cushion portion 14, the shape of the sub-cushion portion 14 can be prevented from being lost.

In addition, since the sub-cushion portion 14 is integrated with the seat cushion pad 12A through the cushion wire 18, the subsequent steps, in particular, a seat surface cover attachment step can be prevented from being complicated.

Furthermore, according to the above-described structure, the through holes 22 respectively include the shutters 26 serving as gates which move to open the through holes 22 when the connectors 17 are inserted into the through holes 22 and move to close the through holes 22 when the connectors 17 are pulled out of the through holes 22.

Therefore, when the connectors 17 are pulled out of the through holes 22, the through holes 22 are closed by the shutters 26. Accordingly, even when the child safety seat is not installed, the through holes 22 are not noticeable. Therefore, the esthetic quality can be maintained even when the child safety seat is not installed. Moreover, since the shutters 26 serve as indications to guide the connectors 17 to the through holes 22, the installability of the child safety seat 29 can be improved. Simultaneously, the friction with the seat surface cover at the insertion of the connectors 17 can be reduced.

As described above, according to the vehicle seat of the present invention, the workability at the installation of a child safety seat can be improved even for a vehicle seat including a seat cushion with a raised rear end. At the same time, preferred appearance can be obtained even when the child safety seat is not installed. Moreover, it is not necessary to greatly change a framework structure in a seat cushion.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A vehicle seat having a seat cushion including an upwardly raised portion at its rear end, a connector backwardly extending from a seat base on which a child safety seat is installed and fixed being allowed to pass through the seat cushion to be connected to a fixation anchor provided at the side of a vehicle body in the rear of the vehicle seat, so as to fix the child safety seat, comprising:
   a seat cushion pad formed at the rear end of the seat cushion;
   a sub-cushion portion attached to the seat cushion pad to complete the seat cushion; and
   a through hole, through which the connector inserted from a front face of the vehicle seat is allowed to project from its back face, the through hole being formed in a state where the sub-cushion portion is attached to the seat cushion pad,
   wherein the through hole is formed such that the fixation anchor to which the connector projecting from the through hole is connected is positioned on an axis of the through hole.

2. The vehicle seat according to claim 1, wherein the sub-cushion portion includes an insertion hole, to which a cushion wire projecting from the seat cushion pad is inserted to be fixed.

3. The vehicle seat according to claim 1, wherein the through hole includes a gate for moving to open the through hole when the connector is inserted into the through hole and for moving to close the through hole when the connector is pulled out of the through hole.

4. The vehicle seat according to claim 1, wherein the sub-cushion portion and the seat cushion portion are formed of a pad material.

5. The vehicle seat according to claim 1, further comprising a guide inserted into the through hole and extending from the front face toward the back face of the vehicle seat.

6. The vehicle seat according to claim 1, wherein the through hole is formed in the seat cushion pad.

* * * * *

UNITED STATES PATENT AND TRADEMARK OFFICE
CERTIFICATE OF CORRECTION

| | |
|---|---|
| PATENT NO. | : 7,093,896 B2 |
| APPLICATION NO. | : 10/694917 |
| DATED | : August 22, 2006 |
| INVENTOR(S) | : Rikiya Morita |

It is certified that error appears in the above-identified patent and that said Letters Patent is hereby corrected as shown below:

On Title Page, Item (63)
The Foreign Priority Data has been omitted. Please inert:

-- November 1, 2002    (JP) .......................................... 2002-319331 --.

Signed and Sealed this

Twelfth Day of December, 2006

JON W. DUDAS
*Director of the United States Patent and Trademark Office*